Jan. 10, 1933.  L. G. JAMES ET AL  1,893,673
MACHINE FOR MANUFACTURING CONFECTIONS
Filed July 22, 1931  3 Sheets-Sheet 2

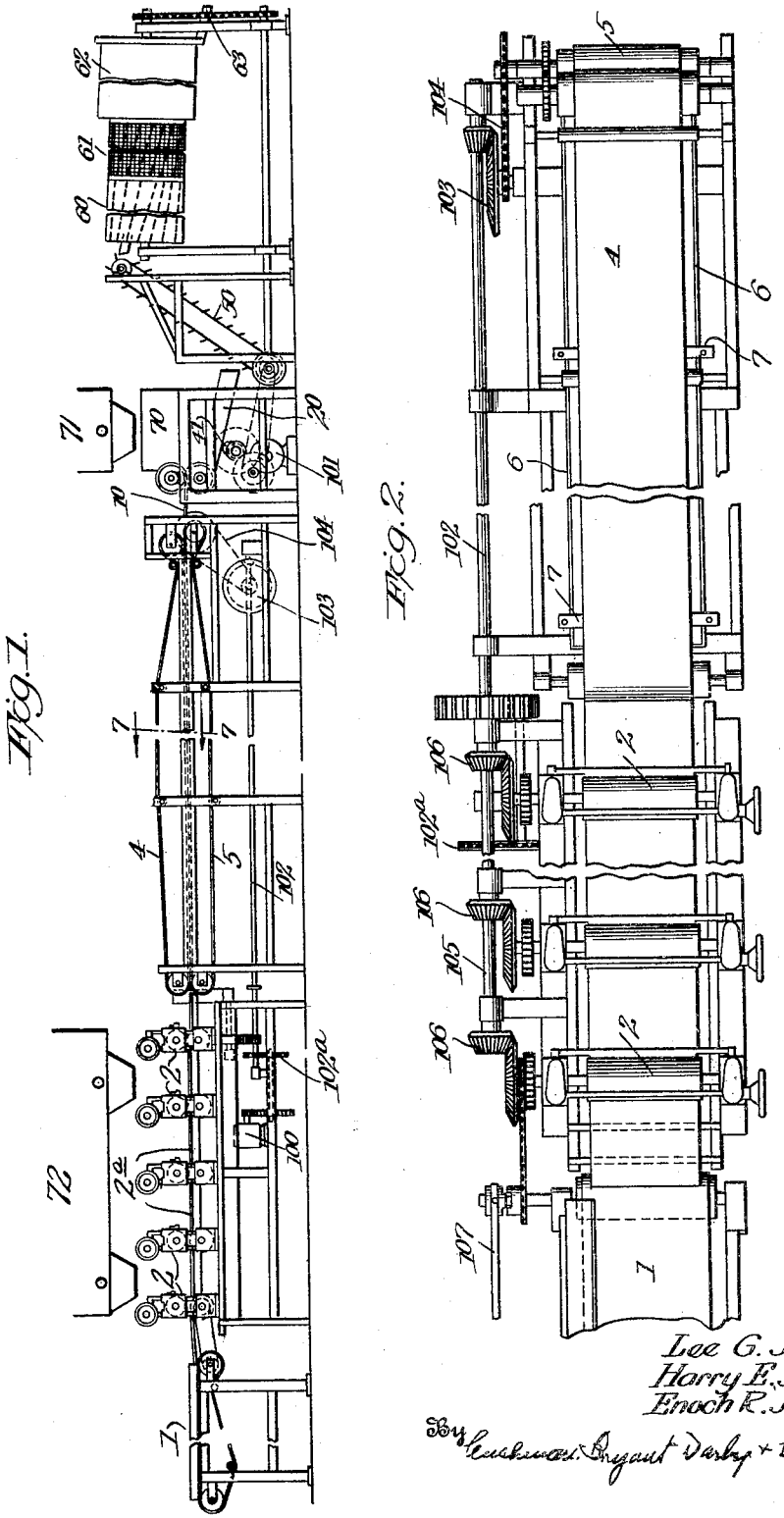

Inventors
Lee G. James,
Harry E. James,
Enoch R. James,
By Cushman, Bryant, Darby & Cushman
Attorneys Jan. 10, 1933.    L. G. JAMES ET AL    1,893,673
MACHINE FOR MANUFACTURING CONFECTIONS
Filed July 22, 1931    3 Sheets-Sheet 3
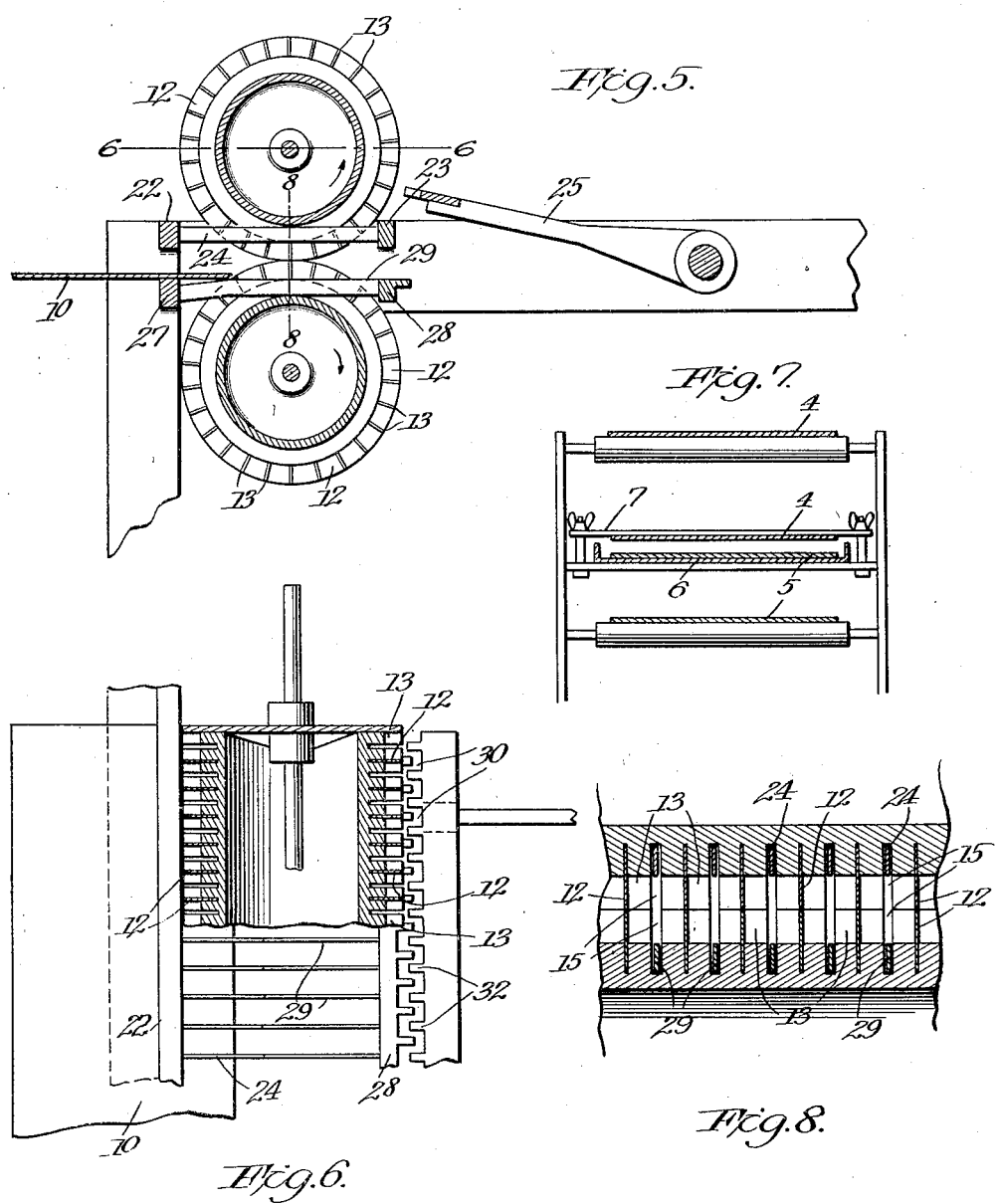
Inventors
Lee G. James,
Harry E. James,
Enoch R. James, Patented Jan. 10, 1933

1,893,673

UNITED STATES PATENT OFFICE

LEE G. JAMES, HARRY E. JAMES, AND ENOCH R. JAMES, OF ATLANTIC CITY, NEW JERSEY, ASSIGNORS TO JAMES', INC., OF ATLANTIC CITY, NEW JERSEY, A CORPORATION OF NEW JERSEY

MACHINE FOR MANUFACTURING CONFECTIONS

Application filed July 22, 1931. Serial No. 552,474.

The present invention relates to improvements in machines for manufacturing confections, and particularly to a machine for carrying out the method described in our prior Patent No. 1,747,116, and copending application, Serial No. 427,012.

As explained in said patent and application, the product of such method is a confection comprising a body of "salt water taffy" type, provided with a coating or casing of edible material, such, for example, as chocolate.

Among the objects of the present invention may be noted the provision of means whereby the individual pieces divided from a sheet-like mass, may be readily separated from the forming devices by which they are produced.

The invention will be more particularly described in connection with the accompanying drawings, in which, Figure 1 is a side elevation of a machine embodying the invention.

Figure 2 is a plan on an enlarged scale, of a portion of the machine.

Figure 5 is a vertical section of parts shown in Fig. 3.

Figure 6 is a partial section substantially on the line 6—6 of Figure 5.

Figure 7 is a section on the line 7—7 of Figure 1.

Figure 8 is a section on the line 8—8 of Figure 5.

Referring to the drawings, in the several figures of which corresponding parts are designated by the same reference characters:

Figure 3:
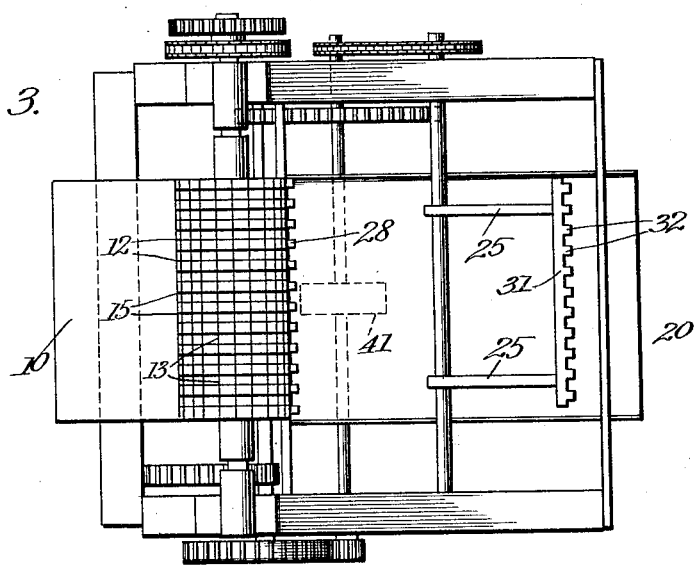
Figure 3 is a plan, on an enlarged scale, of the means for forming individual pieces from a batch of taffy.
Figure 4:
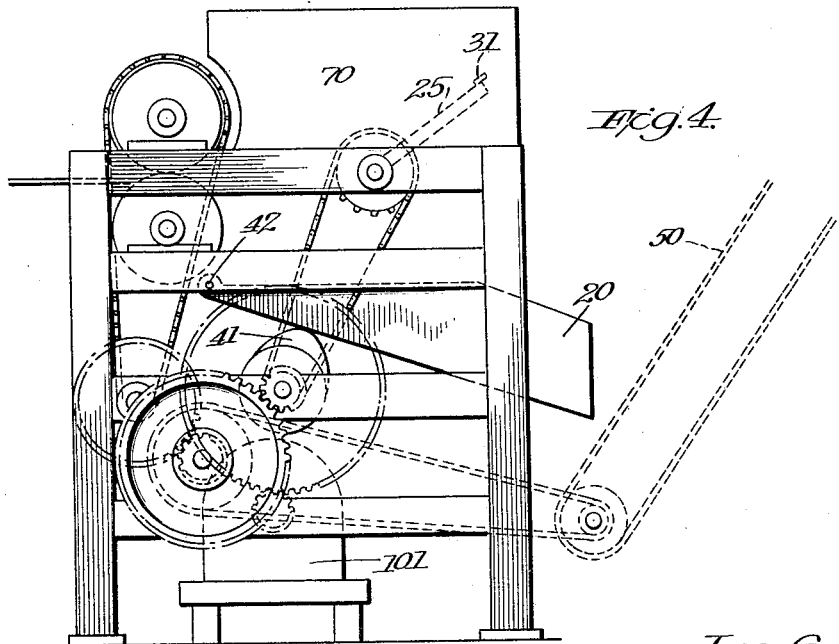
Figure 4 is an elevation of the parts shown in Fig. 3.

1 designates a table-like support upon which is deposited a batch of taffy that has been previously subjected to the usual whipping, beating or pulling operation, so that the mass is properly areated.

As shown, the support for the taffy mass of such table preferably comprises an endless belt by which the mass is fed to means by which it is compressed, and flattened into sheet-like form of the desired thickness.

The batch compressing and sheet-forming means illustrated comprises a plurality of pairs of rollers 2, between which are arranged horizontal supports $2^a$ extending from the pass between one pair of rolls to the pass between the next pair in the series. The passes formed by the several pairs of rolls gradually decrease in height in the direction of the travel of the taffy through such passes so that an initially relative thick and bulky batch will be reduced to elongated sheet-like form having substantially the desired thickness of the finished product.

After passing from the last pair of compressing and reducing rolls, 2, the sheet-like body of taffy is received between two endless belts 4, 5, and allowed to set so that subsequent shrinkage and distortion of pieces cut therefrom will be avoided.

As shown, the operative run of the belt 5 is in contact with a fixed table-like support 6 and the corresponding run or section of the belt 4 is held by suitable vertically adjustable, means 7, at a definite distance from the support 6 so that vertical expansion of the sheet of taffy between said belts is limited and the batch is allowed to set or become relatively stiff while passing between the belts 4, 5.

Lateral expansion of the taffy sheet between the belts 4, 5, may be prevented by providing side flanges on the support 6 and the connecting means 7 permit vertical adjustment of the upper pressure plate, or the one adjacent the upper belt 4, so that the extent of compression of the sheet-like body of taffy can be controlled as desired.

After passing from between the belts 4, 5, the sheet-like batch passes over a suitable support 10, and is subjected to the action of means whereby it is cut into a series of individual pieces of suitable size and contour.

Various means for forming such individual pieces and making each of desired dimensions may be provided.

As shown, the cutting or forming means comprises two superposed rollers, which are positively driven by suitable gearing and each of which is provided with a series of peripheral cutters so related as to provide a series of pockets of the desired dimensions for the individual pieces.

Each roll is provided with a series of annular cutting blades 12, and with auxiliary cutters 13 that extend lengthwise of the rollers between the annular, or circumferentially extending, cutters 12, so as to form with such circumferential cutters a series of annular rows of substantially rectangular shaped pockets, and it will be seen from Figure 5, that each of the individual pieces cut from the batch passing between said rolls will correspond to, and be received in, one of said pockets.

Each of the cutting rolls is provided with a series of annular slots 15 arranged between adjacent circumferential cutters 12, and such slots extend through the side walls of the said pockets or the walls constituted by the cutting blades 13.

As the rolls rotate in the direction indicated by the arrows in Figure 5, the portions thereof forming the peripheral pockets tend to separate, and the contents of such pockets will fall into a chute 20.

To avoid any possibility of the cut pieces adhering to the walls of the pockets of the forming rolls, means are provided for positively ejecting each of said pieces from its respective pocket.

In the embodiment of the invention illustrated, such ejecting means, comprises two relatively stationary frames, the one cooperating with the upper roll including end bars 22, 23, connected by suitable rods or strips 24, which extend through the adjacent slots 15 formed in the upper roll.

Similarly, a stripper frame, comprising front and rear bars 27, 28, and connecting rods 29, extending through the slots 15 in the lower roll, cooperates with that roll.

The frame bar 28 of the article ejecting means for the lower roll is relatively expanded in width to form a shelf-like support that projects forward of the vertical plane of the frame bar 23 of the stripper means of the other roll, and, as shown, this stripper frame member 28 is provided along its front edge with a series of notches 30, such notches being located in substantial alignment with the pockets in the forming rolls.

Means are provided whereby in case the individual pieces passing over the front edge of the stripper frame of the lower roll have not been completely separated from other pieces by the action of the forming rolls they will be positively detached from any other pieces and any fins or webs that may connect two or more of such pieces will be severed.

As shown, such means includes a knocker comprising arms 25 mounted on a shaft 26 and connected at their ends remote from said shaft by a notched or toothed bar 31, the teeth or projections 32 on the free edge of which are adapted to pass through the notches or spaces formed in the lower stripper frame member 28.

As the rolls rotate the stripper rods 24, 29, will act to positively dislodge the individual pieces from the pockets of the forming rolls, by exerting pressure in opposite directions on the top and bottom faces of each individual piece, and as the pieces pass over the free notched edge of the lower stripper member if they are still connected with a following piece, they will be struck by the fingers 32 of the toothed member 31 and this will effectually break any webs or fins that may be connecting the several pieces to others.

The pieces formed as aforesaid will fall into the chute 20, which, as shown, is agitated to vibrate about an axis 42 by a cam 41 geared to the motor mechanism hereinafter described, and such pieces as discharged by said chute are delivered to an endless conveyor 50, by which they are transported to a suitable tumbling means, by which the excess of pulverulent anti-shrinkage material is removed.

Such tumbling means may be of various forms but, as shown, more or less conventionally, comprises a section 60 preferably having a solid peripheral wall, a section 61, the peripheral wall of which is perforated, or of screen material, and a third section 62 which includes a suitable brushing means by which the excess pulverulent material is positively separated from the individual pieces that are discharged as at 63.

The sections 60, 61, of the tumbling or cleaning means are preferably provided interiorly with peripherally arranged fins or webs (represented by dotted lines in Fig. 1) which act to agitate the pieces passing therethrough and assist in dislodging excess pulverulent material therefrom.

As explained in the prior patent and application before referred to, a feature of the method in connection with which the machine of the present case is designed to be employed, is that the taffy batch being treated is subjected to the action of a suitable material which will resist and minimize shrinkage of the cut pieces.

It has been found that pulverulent vegetable material, such as cornstarch or flour, is particularly adapted for this purpose, and such material may be applied to the batch prior to, or while it is being subjected to the action of the compressing rolls 2, and while passing between the belts 4, 5, as well as to the pieces discharged by the forming rolls.

The pulverulent material discharged from the tumbling means 60, 62, may be collected and by a suitable conveying means returned to the casing 70, above the chute 20 where it can be applied to the individual pieces discharged by the forming rolls. Means for this purpose are conventionally illustrated at 71 and 72 on Figure 1 of the drawings.

Any suitable arrangement of power means may be employed for driving the several parts of the machine.

In the embodiment illustrated, the endless belt of the batch support 1, the several compression rolls 2, and the belts 4, 5, are all actuated by a suitable motor 100 while a second motor 101 is employed for driving the forming rolls and means for removing the access of pulverulent material from the individual pieces produced by said rolls.

The motor 100 is connected by suitable gearing with a counter shaft 102, mounted in bearings on the machine frame and which shaft, through a bevel gear 103 and pinion actuates a sprocket chain or belt 104, by which the drive rolls for the belts 4, 5, are rotated. Said drive rolls are geared together so that the belts 4, 5, move in the same direction between the pressure plates before referred to. The counter shaft 102 is rotated by a chain 102$^a$.

The shaft 102 also drives through suitable gearing a second counter shaft 105, on which are mounted a plurality of bevel pinions 106, one for each pair of compression rolls 2.

The endless belt of the support 1 on which the batch is initially deposited is shown as being driven from the first pair of compression rolls by a suitable sprocket chain, such belt being controlled by a suitable clutch and lever 107.

The second motor 101 is geared to rotate the rolls adapted to separate the batch into individual pieces, and also the cam 41 by which the chute 20 is vibrated. It also rotates the shaft in which the knocker 25 is mounted and the conveyor 50, as well as the tumbler mechanism by which excess pulverulent shrinkage preventing material is removed.

We claim:

1. A machine for the manufacture of taffy comprising a rotary roll having a pair of circumferential peripheral blades spaced axially of the roll, and auxiliary blades extending lengthwise of the roll between said circumferential blades, a circumferential slot being provided in the periphery of the roll between the circumferential blades, means for rotating the roll to effect relative bodily movement between the roll and a batch of taffy, whereby an individual piece will be cut from the batch and received in the pocket formed by said blades, and an ejector extending through the said circumferential slot for forcing the individual piece from the pocket as the roll rotates.

2. A machine for the manufacture of taffy comprising two superposed rolls, each provided with a series of peripheral pockets, a circumferential slot being provided in each roll and through opposite walls of the pockets thereof, a relatively stationary rod or bar extending through each of said slots, and means for rotating the rolls, for the purpose described.

3. A machine for the manufacture of taffy comprising two superposed rolls, each provided with an annular series of peripheral pockets the end walls of all of the pockets being provided by two cutter blades extending circumferentially of the roll and the side walls of the pockets being blades extending lengthwise of the roll, a circumferential slot being formed in each roll and extending through the side walls of all of the pockets, means for rotating the rolls, whereby a batch of taffy positioned between the rolls will be separated into individual pieces, each contained in mating pockets in both rolls, and means extending into the circumferential slots in the rolls for ejecting the individual pieces from the pockets.

4. A machine for the manufacture of taffy comprising two superposed rolls, each provided with a plurality of annular rows of peripheral pockets, the end walls of the pockets of each row being provided by two cutter blades extending circumferentially of the roll and the side walls of the pockets being blades extending lengthwise of the roll, a plurality of circumferential slots being provided in each roll and each extending through the side walls of all of the pockets in one annular row, means for rotating the rolls, whereby a batch of taffy positioned between the rolls will be separated into individual pieces, each contained in mating pockets in both rolls, and means extending into the circumferential slots in the rolls for ejecting the individual pieces from the roll pockets.

5. In a machine for the purpose described, the combination of a roll provided with a series of peripheral pockets formed by cutters extending circumferentially and lengthwise of the roll, means for rotating the roll while effecting relative bodily movement between it and a batch of taffy, whereby individual pieces will be cut from the batch and received in each of said pockets, means for ejecting the contents of the pockets, and means for positively breaking any connection that may exist between the pieces formed by successive pockets of the series.

6. A machine for the purpose described, comprising two superposed rolls, each provided with a series of peripheral pockets, means for rotating the rolls, means for feeding a batch of taffy through the pass between the rolls, whereby said batch will be formed into a series of individual pieces, means for expelling the pieces from the pockets, a shelf-like support over which the pieces discharged from the rolls pass, and means cooperating with said support for breaking any connection that may exist between said pieces.

7. A machine for the purpose described, comprising two superposed rolls, each provided with a series of peripheral pockets, means for rotating the rolls, whereby a batch of taffy within the pass between the rolls, will be formed into a series of individual pieces, means for expelling the pieces from the pockets, a shelf-like support over which the pieces discharged from the rolls pass, said support having a series of notches formed in its edge remote from the rolls, and a breaker movable relatively to said support and having a series of projections adapted to pass through the notches in the edge of the said support, for the purpose described.

8. A machine for the purpose described, comprising two superposed rolls, each provided with a series of peripheral pockets, means for rotating the rolls, whereby a batch of taffy within the pass between the rolls will be formed into a series of individual pieces, means for expelling the pieces from the pockets, a shelf-like support over which the pieces discharged from the rolls pass, the edge of said support remote from the rolls having a series of notches formed therein, a breaker having a series of projections corresponding in number and relation to the notches in the edge of said support, means for moving the breaker so that the projections thereon will pass through said notches, and a chute arranged to receive the individual pieces falling from said support.

9. A machine for the manufacture of taffy comprising a rotary roll having a pair of annular peripheral blades spaced axially of the roll, and auxiliary blades extending lengthwise of the roll between said annular blades, a circumferential slot being provided in the periphery of the roll between the annular blades, means for rotating the roll, and effecting relative bodily movement between the roll and a batch of taffy, whereby an individual piece will be cut from the batch and received in the pocket formed by said blades, an ejector extending through the said circumferential slot for forcing the individual piece from the pocket as the roll rotates, a chute adapted to receive the separated pieces, and means for vibrating the chute.

10. In a machine for the purpose described, the combination of two superposed rolls, provided with peripheral cutters, means for compressing a batch of taffy into sheet-like form and feeding the compressed sheet through the pass between said rolls, means for rotating the rolls whereby the sheet of taffy passing between them will be cut into individual pieces, means for separating the individual pieces from the pockets of the rolls, means for applying a pulverulent shrinkage resisting material to the separated pieces discharged from the rolls, and means for removing a portion of such pulverulent material from the pieces.

11. In a machine for the purpose described, the combination of two superposed rolls, provided with peripheral cutters, means for compressing a batch of taffy into sheet-like form and feeding the compressed sheet through the pass between said rolls, means for rotating the rolls whereby the sheet of taffy passing between them will be cut into individual pieces, means for separating the individual pieces from the pockets of the rolls, means for applying a pulverulent shrinkage resisting material to the separated pieces discharged from the rolls, a chute receiving the pieces from the pockets of the rolls, tumbler means for removing excess of the pulverulent material from said pieces, and means for transporting the pieces from the chute to the tumbler means.

12. In a machine for the purpose described, the combination of two superposed rolls, provided with peripheral cutters, means for compressing a batch of taffy into sheet-like form and feeding the compressed sheet through the pass between said rolls, means for rotating the rolls whereby the sheet of taffy passing between them will be cut into individual pieces, a circumferential groove being provided in the periphery of each roll, and an ejector extending through each of said circumferential grooves.

13. In a machine for the purpose described, the combination of two superposed rolls provided with peripheral cutters, means for compressing a batch of taffy into sheet-like form and feeding the compressed sheet through the pass between said rolls, means for rotating the rolls whereby the sheet of taffy passing between them will be cut into individual pieces, a circumferential groove being formed in the periphery of each roll, and two substantially parallel ejector bars each extending through one of said peripheral grooves.

In testimony whereof we affix our signatures.

LEE G. JAMES.
HARRY E. JAMES.
ENOCH R. JAMES.